United States Patent Office 3,438,938
Patented Apr. 15, 1969

3,438,938
POLYESTER RESINS AND PREPARATION THEREOF
Bryce C. Oxenrider, Florham Park, and Richard B. Lund, Whippany, N.J., assignors to Allied Chemical Corporation, New York, N.Y., a corporation of New York
No Drawing. Filed Jan. 24, 1966, Ser. No. 522,420
Int. Cl. C08g 17/08
U.S. Cl. 260—47    5 Claims

ABSTRACT OF THE DISCLOSURE

This invention relates to polyester resins prepared from bisphenols selected from the group consisting of 2,2-bis (4'-hydroxyphenyl) - 1,1a,3,3a,4,5,5a,5b,6-decachlorooctahydro-1,3,4-metheno-2H-cyclobuta[cd] pentalene and derivatives thereof having one or both of the positions ortho to each phenolic hydroxyl group substituted with alkyl and/or halogen substituents. The polyesters of this invention possess excellent thermal stability and can be molded, extruded and solvent cast to form films, fibers and shaped articles.

---

In the past, polyester resins have been produced by the reaction of dihydric alcohols with difunctional acids or the acyl chloride or ester derivatives thereof. These polyesters are generally characterized by glass transition temperatures of less than 150° C. making them unsuitable for high temperature applications.

It is an object of the present invention to provide novel polyester resins having improved high temperature properties.

Another object of this invention is to provide a process by which high yields of the above-described polyesters can be obtained.

Additional objects and advantages of this invention will be apparent from the following detailed description thereof.

According to the present invention, polyester resins are prepared by the reaction of 2,2-bis(4'-hydroxyphenyl)- 1,1a,3,3a,4,5,5a,5b,6-decachlorooctahydro-1,3,4-metheno-2H-cyclobuta[cd]pentalene or a derivative thereof having alkyl and/or halogen substituents in one or both of the positions ortho to each phenolic group, said bisphenols being hereinafter referred to as "DCMP bisphenols," with a compound selected from the group consisting of difunctional organic acids and the diacid chloride and diester derivatives thereof. The polyesters thus produced are characterized by excellent thermal stability and possess glass transition temperatures (hereinafter referred to as "Tg") of at least 150° C. The polyesters can be molded, extruded, or solution cast to form films, fibers, and shaped articles.

The DCMP bisphenols are white, crystalline solids of the formula:

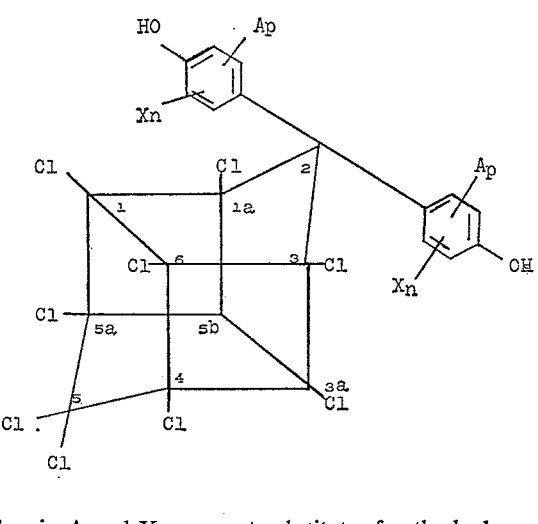

wherein A and X represent substitutes for the hydrogens in a position ortho to the phenolic hydroxyl group with substitution on the two benzene rings being identical; A is alkyl preferably having 1 to 3 carbon atoms; X is a halogen preferably selected from the group consisting of chlorine and bromine; $n$ is an integer from 0 to 2; $p$ is an integer from 0 to 2, and the sum of $n$ and $p$ being less than 3. These bisphenols can be prepared by reacting 1,1a,3,3a, 4,5,5a,5b,6 - decachlorooctahydro - 1,3,4-metheno-2H-cyclobuta[cd]pentalen-2-one with a phenolic compound of the formula:

$$HO-\underset{X_n}{\overset{A_p}{\underset{|}{\bigcirc}}}$$

wherein A, X, $n$ and $p$ have the meanings given above, and the position para to the hydroxy group is unsubstituted, in the presence of a sulfonic acid. Said bisphenols and processes for their preparation are disclosed in more detail in copending United States patent application Ser. No. 435,724 of Arleen C. Pierce and Neil A. Lindo filed Feb. 26, 1965.

In its preferred embodiments, the polyesters of this invention are composed of recurring units of the formula:

where A, X, $n$ and $p$ have the meanings given above, and $R_1$ is a divalent hydrocarbon radical or a divalent etheric oxahydrocarbyl radical. Preferably, $R_1$ contains up to 20 carbon atoms. These polyesters can be prepared by reacting one of the above-defined DCMP bisphenols with a carbonyl group containing a compound of the formula:

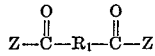

where $R_1$ has the meaning given above, and Z is hydroxy, chlorine, or an alkoxy group preferably containing 1 to 10 carbon atoms.

Illustrative of carbonyl group-containing compounds suitable for use in the present invention are malonic acid; succinic acid; adipic acid; azelic acid; sebacic acid; maleic acid; fumaric acid; phthalic acid; isophthalic acid; terephthalic acid; 2,2-bis(4-carboxyphenyl) propane; bis(4-carboxyphenyl) methane; 4,4'-dicarboxydiphenyl ether; dicarboxydimethyl ether; 2,2'-dicarboxydiethyl ether; the diacid chlorides of the above acids; and the dialkyl esters of the above acids in which the alkyl groups contain from 1 to 7 carbon atoms.

A preferred process by which excellent yields of high molecular weight polyester can be obtained is to react the DCMP bisphenol with a diacid chloride. Advantageously, the reaction is carried out in the presence of a catalyst selected from the group consisting of quanternary ammonium, phosphonium, arsonium and sulfonium compounds. Usually approximately equal molar proportions of the diacid chloride and bisphenol are used, although an excess of either reactant can be employed. The reaction mixture generally contains water as a solvent for the bisphenol plus an organic solvent for the diacid chloride. The organic solvent is usually a chlorinated hydrocarbon such as ethylene dichloride. A sufficient amount of base can be added to the system to neutralize the hydrogen chloride formed. The reaction can be conducted over a wide temperature range. Advantageously, the reaction is carried out at a temperature of 0° to 100° C. but higher or lower temperatures can be used if desired.

As a modification of this invention, up to about 80 mol percent of the DCMP bisphenol can be replaced by one or more bisphenols selected from the group consisting of compounds of the formulas:

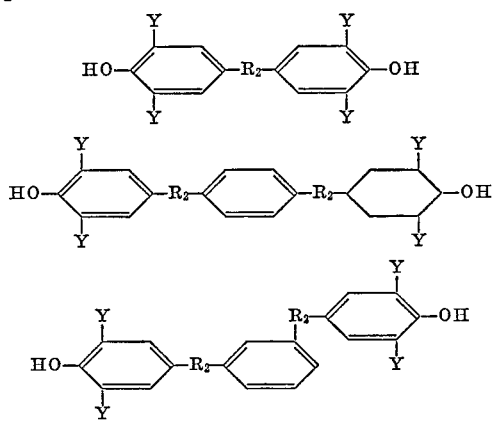

where $R_2$ is an alkylene group of 1 to 6 carbon atoms, and Y at each occurrence is independently selected from the group consisting of hydrogen, chlorine and lower alkyl. Illustrative of suitable bisphenols are 2,2-bis(4-hydroxyphenyl)propane;
bis(4-hydroxyphenyl)methane;
2,2-bis(4-hydroxy-3,5-dimethylphenyl)propane;
2,2-bis(4-hydroxy-3,5-dichlorophenyl)propane;
bis(4-hydroxy-3,5-dibromophenyl)methane;
2,2-bis(4-hydroxyphenyl)hexane;
α,α'-bis(p-hydroxyphenyl)-p-diisopropylbenzene;
α,α'-bis(p-hydroxy-m-methylphenyl)-p-diisopropylbenzene;
α,α-bis(p-hydroxy-m-chlorophenyl)p-diisopropylbenezne;
α,α'-bis(p-hydroxyphenyl)-m-diisopropylbenzene;
1,4-bis(p-hydroxybenzyl)benzene;
1,4-bis(4-hydroxy-3,5-dibromobenzyl)benzene;
1,4-bis(4-hydroxy-3,5-dimethylbenzyl)benzene;
and 1,4-bis(4-hydroxy-3-chloro-5-methylbenzyl)benzene.

The polyesters obtained by the use of a mixed bisphenol system generally have glass transition temperatures which are higher than those obtained when no DCMP bisphenol is employed but lower than those obtained when all of the bisphenol is a DCMP bisphenol. It is thus apparent that DCMP bisphenol can be added to a conventional polyester reaction mixture to upgrade the polymer produced.

The Tg of a polymer may be defined as the temperature at which the polymer changes from a glassy or brittle condition to a rubbery plastic or liquid condition. It is at temperatures in the vicinity of this glass transition temperature that the sharpest transition from the glass-like to the plastic or viscous mechanism of deformation appears. Thus, in the vicinity of this Tg, there is a distinct change in the slope of curves of temperature versus tensile properties and other temperature-dependent physical properties. Below the region of Tg, physical properties of polymers in general are only slightly dependent upon temperature; whereas, when temperatures rise into the Tg region, a sharp decrease is observed in tensile and bending moduli, and tenacity; and a sharp increase is observed in elongation, shrinkage, and creep, etc. In short, at and above its Tg the polymer exhibits much greater deformation under given stress than at lower temperatures.

The Tg can be measured by various methods which give identical or only slightly different results. The Tg's in the present work were determined from a plot of apparent modulus of rigidity (measured in accordance with ASTM Test D-1053) versus temperature. The apparent modulus of rigidity drops sharply at the Tg, and for the purposes of our determinations, a point in the vertical portion of the curves corresponding to 14,500 p.s.i. was said to represent the modulus of rigidity at the Tg.

The following examples are given to further illustrate the invention and to describe the best mode contemplated by us for carrying it out, but it is to be understood that the invention is not to be limited in any way by the details described therein. In the examples, the tensile properties were measured in accordance with ASTM test D-638.

EXAMPLE 1

13.2 grams (20 millimols) of 2,2-bis(4'-hydroxyphenyl)-1,1a,3,3a,4,5,5a,5b,6 - decachlorooctahydro - 1,3,4-metheno - 2H - cyclobuta[cd]pentalene, 0.5 grams (1.48 millimols) of tetrabutylphosphonium bromide and 4.0 grams (71.4 millimols) of KOH were dissolved in 175 milliliters of water. The mixture was cooled and stirred in a Waring blender and a solution of 4.8 grams (20 millimols) of sebacyl chloride in 100 ml. of ethylene dichloride was added over the course of 2 minutes. Stirring was continued for an additional 8 minutes, after which the organic phase was quite viscous.

An additional 150 ml. of ethylene dichloride was added, the layers separated, and the organic layer washed once with dilute HCl (10 ml. conc. HCl and 300 ml. $H_2O$) and five times with deionized water. The polyester was precipitated by adding the organic layer to 2 liters of isopropanol. The precipitate was collected by vacuum filtration and then dried in a vacuum oven at 80° C./1 mm. for 20 hours. A total of 12.3 grams of polymer (74% yield) was obtained having an inherent viscosity of 0.49 in a 0.5% solution in ethylene dichloride at 25° C., a Tg of 165° C., and a flow point of 240°–255° C.

EXAMPLE 2

Ten grams (15.2 millimols) of the bisphenol used in Example 1, 0.1 grams of tetrabutylphosphonium bromide, and 4 grams of potassium hydroxide were dissolved in 133 ml. of water. A solution of 3.1 grams (15.3 millimols) of isophthaloyl chloride in 76 ml. of ethylene dichloride was added to the first solution and stirred therewith for two minutes while maintaining the reaction mixture at less than 30° C. with an ice bath. 350 milliliters of ethylene dichloride were added after which the reaction mixture was poured into 2 liters of acetone. The polyester of the above bisphenol and isophthaloyl chloride were precipitated and was collected by filtration. A total of 11.6 grams of polymer was obtained representing a yield of 97%. The polymer did not melt when subjected to temperatures as high as 470° C.

EXAMPLE 3

7.5 grams (11.4 millimols) of the bisphenol used in Example 1, 1.31 grams (2.94 millimols)) of α,α′-bis(p-hydroxyphenyl)-p-diisopropylbenzene, 0.1 gram tetrabutylphosphonium bromide, and 3.2 grams of potassium hydroxide were dissolved in 133 ml. of water. A solution of 3.1 grams of isophthaloyl chloride and 76 ml. of ethylene chloride was added to the first solution and stirred therewith for 2 minutes while maintaining the reaction mixture at less than 30° C. in an ice bath. 350 milliliters of ethylene dichloride was added after which the reaction mixture was poured into 1500 ml. of acetone. The polyester of the above mixture of bisphenols and isophthaloyl chloride precipitated and was collected by filtration. A total of 8.5 grams (82% yield) of polymer was obtained. The polymer had an inherent viscosity of 0.38 in a 0.5% solution in ethylene dichloride at 25° C., a flow point of 290°–300° C. and a Tg of 250° C. A film cast from ethylene dichloride had an ultimate elongation of 9.5%, an ultimate tensile strength of 8670 p.s.i. and a 2% secant modulus of 274,300 p.s.i.

EXAMPLE 4

The procedure of Example 3 was repeated, except that 9.0 grams (13.5 millimols) of 2,2-bis(4′-hydroxyphenyl)-1,1a,3,3a,4,5,5,5a,5b,6-decachlorooctahydro-1,3,4 - metheno-2H-cyclobuta[cd]pentalene and 0.52 grams (1.17 millimols) of α,α′-bis(p-hydroxyphenyl)-diisopropylbenzene were used. A total of 10 grams (87% yield) of polyester was obtained. The polymer did not flow when heated to 360° C. A film was cast from tetrachloroethylene and extracted with methanol to remove occluded solvent. The film had an ultimate elongation of 6.3%, an ultimate tensile strength of 7440 p.s.i., and a 2% secant modulus of 198,740 p.s.i.

It will be apparent that many modifications and variations may be effected without departing from the scope of the novel concepts of the present invention and the illustrative details disclosed are not to be construed as imposing undue limitations on the invention.

We claim:
1. A resinous polymeric polyester of a bisphenol compound of the formula

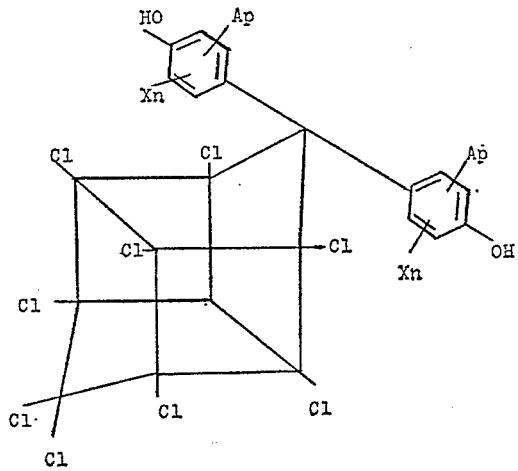

wherein A and X represent substitutes for the hydrogens in a position ortho to the phenolic hydroxyl group with substitution on the two benzene rings being identical; A is alkyl having 1 to 3 carbon atoms; X is a halogen selected from the group consisting of chlorine and bromine; $n$ is an integer from 0 to 2; $p$ is an integer from 0 to 2, and the sum of $n$ and $p$ is less than 3 and an acid compound selected from the group consisting of difunctional dicarboxylic acids and the diacid chloride and diester derivatives thereof.

2. A film prepared from the polymeric polyester of claim 1.

3. A polymeric polyester as claimed in claim 1 wherein $n$ and $p$ are each equal to 0.

4. A resinous polymeric polyester of (A) a first bisphenol compound of the formula

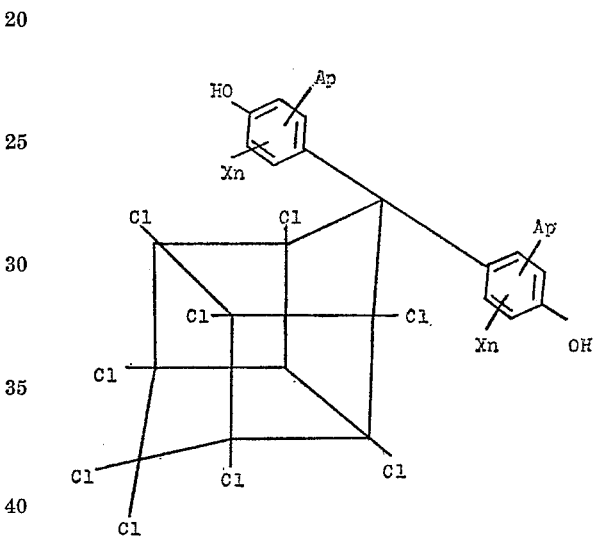

wherein A and X represent substitutes for the hydrogens in a position ortho to the phenolic hydroxyl group with substitution on the two benzene rings being identical; A is alkyl having 1 to 3 carbon atoms; X is a halogen selected from the group consisting of chlorine and bromine; $n$ is an integer from 0 to 2; $p$ is an integer from 0 to 2, and the sum of $n$ and $p$ is less than 3, (B) a second bisphenol compound selected from the group consisting of compounds of the formulas:

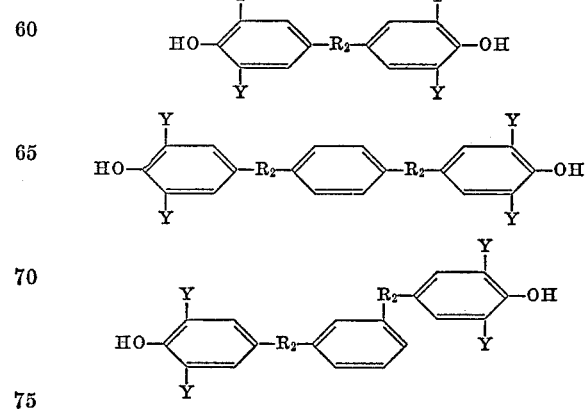

and mixtures thereof wherein $R_2$ is an alkylene group of 1 to 6 carbon atoms, and Y at each occurrence is independently selected from the group consisting of hydrogen, chlorine and lower alkyl and (C) an acid compound selected from the group consisting of difunctional dicarboxylic acids and the diacid chloride and diester derivatives thereof, at least one mol of said first bisphenol compound being present for every four mols of said second bisphenol compound.

5. A resinous polyester polymer having repeating structural units of the formula

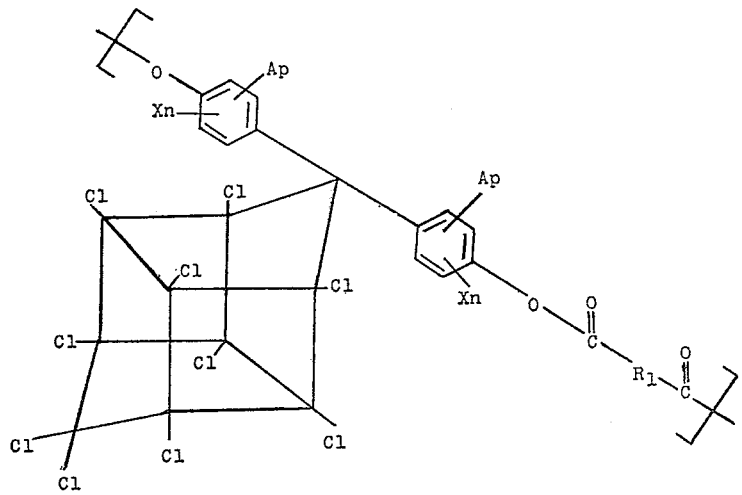

wherein A and X are substituents for hydrogens in a position ortho to the phenolic hydroxyl groups with substitution on the two benzene rings being identical, A is alkyl having 1 to 3 carbon atoms, X is a halogen selected from the group consisting of chlorine and bromine; $n$ is an integer from 0 to 2; $p$ is an integer from 0 to 2; the sum of $n$ and $p$ is less than 3; and $R_1$ is a divalent hydrocarbon radical or an etheric radical selected from the group consisting of

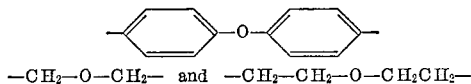

$-CH_2-O-CH_2-$ and $-CH_2-CH_2-O-CH_2CH_2-$

References Cited

UNITED STATES PATENTS

| | | |
|---|---|---|
| 3,028,364 | 4/1962 | Conix et al. |
| 3,055,948 | 9/1962 | Hoch et al. |
| 3,230,195 | 1/1966 | Conix. |
| 3,361,717 | 1/1968 | Gilbert et al. |

OTHER REFERENCES

Convix Ind. and Eng. Chem., vol. 51, No. 2, February 1959, pp. 147–150.

WILLIAM H. SHORT, *Primary Examiner.*

LOUISE P. QUAST, *Assistant Examiner.*

U.S. Cl. X.R.

260—620